United States Patent [19]
Gerhart

[11] Patent Number: 5,974,482
[45] Date of Patent: *Oct. 26, 1999

[54] SINGLE PORT FIRST-IN-FIRST-OUT (FIFO) DEVICE HAVING OVERWRITE PROTECTION AND DIAGNOSTIC CAPABILITIES

[75] Inventor: Paul B. Gerhart, North Wales, Pa.

[73] Assignee: Honeywell Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/716,629

[22] Filed: Sep. 20, 1996

[51] Int. Cl.$^6$ .................................................. G06F 13/00
[52] U.S. Cl. ................................................ 710/52; 710/57
[58] Field of Search ..................................... 395/872, 877, 395/853, 854, 855; 711/147, 150, 151, 152; 710/53, 57, 33–35

[56] References Cited

U.S. PATENT DOCUMENTS

| | | | |
|---|---|---|---|
| 3,818,461 | 6/1974 | Ward et al. | 710/34 |
| 4,258,418 | 3/1981 | Heath | 710/53 |
| 4,527,233 | 7/1985 | Ambrosius, III et al. | 711/167 |
| 4,873,666 | 10/1989 | Lefebvre et al. | 365/189.07 |
| 4,942,553 | 7/1990 | Dalrymple et al. | 710/57 |
| 5,295,246 | 3/1994 | Bischoff et al. | 395/854 |
| 5,371,877 | 12/1994 | Drako et al. | 711/109 |
| 5,406,554 | 4/1995 | Parry | 370/381 |
| 5,557,751 | 9/1996 | Banman et al. | 359/144 |
| 5,572,148 | 11/1996 | Lytle et al. | 326/41 |
| 5,619,687 | 4/1997 | Langan et al. | 395/557 |
| 5,657,475 | 8/1997 | Gillespie et al. | 435/235.1 |
| 5,760,792 | 6/1998 | Holt et al. | 345/509 |
| 5,771,356 | 6/1998 | Leger et al. | 709/223 |
| 5,784,649 | 7/1998 | Begur et al. | 710/52 |
| 5,794,037 | 8/1998 | Young | 709/108 |
| 5,797,043 | 8/1998 | Lewis et al. | 710/56 |
| 5,832,216 | 11/1998 | Szczepanek | 709/250 |
| 5,884,099 | 3/1999 | Klingelhofer | 710/52 |
| 5,892,979 | 4/1999 | Shiraki et al. | 710/52 |
| 5,901,328 | 3/1999 | Ooe | 711/100 |

OTHER PUBLICATIONS

"Fiber–Optic Distributed Data Interface Network Test Adaptor Page Memory Interface Circuit," IBM Tech. Disclosure Bulletin, vol. 34, No. 9, pp. 114–116, Feb. 1992.

Primary Examiner—Zarni Maung
Assistant Examiner—Andrew Caldwell
Attorney, Agent, or Firm—Joseph J. Kaloko

[57] ABSTRACT

A FIFO single port storage device and methods for using the same are disclosed. The FIFO device includes a single port memory for storing data from a host processor. The single port memory is addressed in a sequential and non-random manner, possibly by a monotonically increasing counter. Control circuitry coupled to the counter and the memory allows for the reading/writing of host data from/to the single port memory. Write protect circuitry prevents host writes to the single port memory by entering a write protect state under combinations of the following conditions: (1) the FIFO is full; (2) the FIFO is nearly full, as defined by a host programmable threshold; (3) the host processor commands the FIFO to enter the write protect state; or (4) the host processor acknowledges a FIFO nearly full interrupt. The errant, or stray, write detection circuitry sets a status flag if a write occurs while the FIFO is in the write protect state. The errant write detection circuity detects stray writes to the memory based on the write protect state value and the quantity of data stored in the FIFO, independent of any particular range of memory protected. Information is read from the FIFO by entering the write protect state, determining the quantity of stored FIFO data, reading the data, and resetting the quantity of data to zero. The FIFO device may be implemented using a field programmable gate array, or FPGA.

25 Claims, 3 Drawing Sheets

SINGLE PORT FIRST-IN-FIRST-OUT (FIFO) DEVICE HAVING OVERWRITE PROTECTION AND DIAGNOSTIC CAPABILITIES

BACKGROUND OF THE INVENTION

1. Field of the Invention

The invention relates generally to data storage devices and more particularly to First-In-First-Out (FIFO) type data storage devices that include an over-write protection feature and diagnostic capabilities.

In practice the invention enables limited hardware resources to be used to fabricate a "single port" FIFO storage device (as defined hereinafter) having the desired over-write protection feature and diagnostic capabilities. The single port FIFO storage device contemplated by the invention is as robust (feature rich) and can be used as safely as more elaborate, hardware-consuming, FIFO devices, such as a traditional "dual port" FIFO (also defined hereinafter).

Further specific aspects of the invention are directed to methods and apparatus for providing a single port FIFO storage device which has (a) a write protection feature to ensure that FIFO memory contents are not disturbed once the FIFO memory becomes full; (b) a first diagnostic feature to provide host software with an indication that the protection feature is in-force; and (c) a second diagnostic feature which provides host software with an indication that it (the software) may have errantly attempted to disturb a full FIFO memory (defined herein as an "Errant Write" condition) before securely and completely emptying the FIFO memory's contents.

2. Description of the Related Art

It is well known to utilize commercially available memory devices, such as Random Access Memory (RAM), to at least temporarily store data in a digital computer that includes a host processor coupled to the memory via a data bus and a memory control bus. Typically, software being executed by the host processor stores (writes) data to such memory and when desired retrieves (reads) data stored in the memory. A memory controller is commonly used to control read and write activity in response to signals from the processor (received over the memory control bus) and in response to internal memory conditions (such as when the memory becomes full, etc.)

It is also well known to use a variety of data storage and retrieval techniques to improve the operating characteristics and efficiency of a computing system and data storage devices contained therein. In some cases the nature of the data being processed dictates the most efficient data storage and retrieval technique to be used.

For example, it may in some applications be desirable to process the last (most recent) data entry stored in a memory before processing prior ("older") entries. In this case a well known storage and retrieval technique, commonly referred to by those skilled in the art as a Last-In-First-Out ("LIFO") technique, may be used; with the memory, memory addressing mechanism and controller being used to implement this technique being collectively referred to as a LIFO storage device.

In other applications, such as those supported by the present invention, it is desirable to always process the first (and after the first the next "oldest") data entry stored in a memory before processing any more recent entry. In this case a well known storage and retrieval technique, commonly referred to by those skilled in the art as a First-In-First-Out ("FIFO") technique, may be used; with the memory, memory addressing mechanism and controller being used to implement this technique being collectively referred to as a FIFO storage device (or simply a FIFO).

FIFO storage devices (also referred to herein as FIFO memories and FIFOs) are well known to those skilled in the art. A traditional commercially available FIFO memory is a "dual port" device, that is it permits the simultaneous storing and emptying of data (or permits these operations in an interleaved fashion); and includes two address counters, an arbitration mechanism to manage the simultaneous storing and emptying of data, a comparator of the two address counters to determine the "full" condition, etc.

As used herein the term "single port" storage device is defined as a storage device that does not permit the simultaneous (or interleaved) storing and emptying of data. Such a device is considerably simpler and less expensive than a traditional dual port FIFO since it would not require the aforementioned pair of address counters, arbitration mechanism and comparator.

In view of the complexity of dual port FIFOs from a hardware perspective (and cost of same), it would be desirable to provide single port storage devices (and corresponding methods for operating such devices), that are as safe to operate as more elaborate, hardware-consuming, dual port FIFO storage devices.

More particularly, it would be desirable to provide a single port storage device (and corresponding methods for operating such a device), that offers an over-write protection feature and diagnostic capabilities to ensure safe operation; while at the same time requiring only limited hardware resources when compared with a traditional dual port FIFO storage device.

Specifically, it would be desirable to provide methods and apparatus for realizing a single port FIFO storage device which has (a) a write protection feature to ensure that the FIFO contents are not disturbed once the FIFO becomes full; (b) a first diagnostic feature to provide host software with an indication that the protection feature is in-force; and (c) a second diagnostic feature which provides host software with an indication that it (the software) may have errantly attempted to disturb a full FIFO before securely and completely emptying the FIFO's contents.

Still further, it would be desirable to provide a single port FIFO storage device (and corresponding methods for operating same) that can be easily implemented using field programmable gate array (FPGA) technology to reduce hardware complexity and cost when compared with the hardware (and methods) presently used to fabricate (operate) traditional dual port FIFO storage devices.

SUMMARY OF THE INVENTION

In view of the foregoing, it is a general object of the invention to provide single port FIFO storage devices (and corresponding methods for operating such devices), that are as safe to operate as more elaborate, hardware consuming, dual port FIFO storage devices.

It is a specific object of the invention to provide a single port FIFO storage device (and corresponding methods for operating such a device), that offers an over-write protection feature and diagnostic capabilities to ensure safe operation; while at the same time requiring only limited hardware resources when compared with a traditional dual port FIFO storage device.

More particularly, it is an object of the invention to provide methods and apparatus for realizing a single port FIFO storage device which has (a) a write protection feature to ensure that the FIFO contents are not disturbed once the FIFO becomes full; (b) a first diagnostic feature to provide host software with an indication that the protection feature is in-force; and (c) a second diagnostic feature which provides host software with an indication that it (the software) may have errantly attempted to disturb a full FIFO before securely and completely emptying the FIFO's contents.

Still further, it is an object of the invention to provide a single port FIFO storage device (and corresponding methods for operating same) that can be easily implemented using FPGA technology to reduce hardware complexity and cost when compared with the hardware (and methods) presently used to fabricate (operate) traditional dual port FIFO storage devices.

According to one aspect of the invention, limited hardware resources, in the form of a FPGA, may be used to fabricate a single port FIFO storage device having the desired over-write protection feature and diagnostic capabilities; with the protection feature and diagnostic capabilities allowing the single port FIFO storage device contemplated by the invention to be used as safely as a traditional dual port FIFO.

According to one specific embodiment of the invention, a single port storage device serving as a First-In-First-Out ("FIFO") data storage device for a host processor coupled thereto, comprises: (a) a memory for a least temporarily storing data provided by the host; (b) memory address means; (c) control means, coupled to the memory and the memory address means, for controlling the writing of host data to and the reading of host data from the memory in a FIFO fashion, including: (c1) means for determining if the memory is full; (c2) write protect means for placing the memory in a write protect state whenever the memory is full; and (c3) errant write detection means for determining if an attempt is made by the host to write to the memory whenever the memory is in the write protect state.

Furthermore, according to a preferred embodiment of the invention, the control means comprises interrupt means for generating a hardware interrupt to the host whenever the memory reaches a predefined "nearly full condition" (where a "nearly full condition" is defined herein to exist when the memory reaches or exceeds a predefined percentage of being full, reaches or exceeds a predetermined number of memory locations being occupied, etc., where the "nearly full condition" is a threshold that may be established by those skilled in the art based, for example, on memory cycle time, processor instruction processing speed, etc.; or could even, for example, be set at some arbitrary figure, such as the memory being 90% full, etc.); the write protect means is further operative to place the memory in the write protect state in response to a signal from the host acknowledging receipt of the interrupt; the memory, memory address means and control means are all implemented in a FPGA; the memory means is a random access memory (RAM); and the memory address means is a monotonically increasing counter.

The invention may be alternately characterized as a method for storing data in an addressable single port data storage device serving as a First-In-First-Out ("FIFO") memory for a host processor coupled thereto, comprising the steps of: (a) at least temporarily storing data provided by the host in the addressable single port data storage device; and (b) controlling the writing of host data to and the reading of host data from the device in a FIFO fashion, including the steps of: (b1) determining if the memory is full; (b2) placing the memory in a write protect state whenever the memory is full; and (b3) determining if an attempt is made by the host to write to the memory whenever the memory is in the write protect state.

Furthermore, a preferred embodiment of the above described method further comprises the steps of generating a hardware interrupt to the host whenever the memory reaches a predefined nearly full condition; placing the memory in the write protect state in response to a signal from the host acknowledging receipt of the interrupt; implementing the addressable single port data storage device in a FPGA; at least temporarily storing data using a RAM; utilizing a counter to address the memory and increasing the counter monotonically to perform both read and write operations.

According to a further aspect of the invention, apparatus for storing data in an addressable single port data storage device serving as a First-In-First-Out ("FIFO") memory for a host processor coupled thereto comprises: (a) write protect means for placing the data storage device in a write protect state thereby preventing data from being written thereto; (b) means for determining if the data storage device is in a predefined nearly full condition; (c) means for generating a hardware interrupt in response to the detection of the nearly full condition; and (d) errant write detection means for detecting if an attempt is made to write to the data storage device while the device is in the write protect state.

According to a preferred embodiment of this further aspect of the invention, the write protect means is operative to place the data storage device in the write protect state whenever the FIFO is full; the write protect means is further operative to place the storage device in the write protect state in response to a signal from the host acknowledging receipt of the hardware interrupt; and the means for determining, the for generating and the errant write detection are all implemented in a FPGA.

Yet another characterization of the invention is a method for storing data in an addressable single port data storage device serving as a First-In-First-Out ("FIFO") memory for a host processor coupled thereto, comprising the steps of: (a) placing the data storage device in a write protect state thereby preventing data from being written thereto; (b) determining if the data storage device is in a predefined nearly full condition; (c) generating a hardware interrupt in response to the detection of the nearly full condition; and (d) detecting if an attempt is made to write to the data storage device while the device is in the write protect state.

A preferred embodiment of this last described method further comprises the steps of placing the data storage device in the write protect state is performed whenever the FIFO is full; and placing the data storage device in the write protect state is performed in response to a signal from the host acknowledging receipt of the hardware interrupt.

Still another characterization of the invention is a method for storing data in an addressable single port data storage device serving as a First-In-First-Out ("FIFO") memory for a host processor coupled thereto, wherein the data storage device is addressable via a resettable monotonically increasing counter and includes means for signalling a predefined nearly full condition, means for signalling a write protect state and means for signalling an errant write status condition whenever the host attempts a write to the memory when a write protect state exists, comprising the steps of: (a) at least temporarily storing data provided by the host in the addressable single port data storage device; and (b) controlling the writing of host data to and the reading of host data from the device in a FIFO fashion, including the steps of: (b1) determining if the device is in the predefined nearly full condition; (b2) placing the device in the write protect state whenever the device is determined to be in the nearly full condition; (b3) determining if the errant write status condition exists; and (b4) signalling an error whenever the errant write status condition is determined to exists.

A preferred embodiment of this last described method further comprises the steps of (a) reading and resetting the counter; (b) reading the contents of the memory utilizing the value of the counter as read; (c) taking the device out of the write protect state after the contents of the memory have been read; and (d) resetting the counter.

Finally, the invention may also be characterized as a single port data storage device serving as a First-In-First-Out ("FIFO") memory for a host processor coupled thereto, comprising: (a) write-protect means for placing the memory in a write protect state to ensure the integrity of data stored in the memory; (b) first diagnostic means for determining when the memory is in the write protect state and for making available to the host processor an indication that the memory is in the write protect state; and (c) second diagnostic means for determining if the host processor is errantly attempting a write to the memory when the memory is in the write protect state and for making available to the host processor an indication that the memory is in an errant write state.

A preferred embodiment of this last described device further comprises means for generating a hardware interrupt to the host whenever the memory reaches a predefined nearly full condition and a write-protect means which is operative to place the memory in the write protect state whenever the FIFO is full and whenever the FIFO is commanded to enter a write state by the host processor.

The invention features the ability to provide a FIFO storage device for servicing a host processor using only a minimal hardware implementation (using the aforementioned single port design and taking advantage of FPGA technology); while providing the aforementioned write protection feature and diagnostic features (which may be used to indicate the aforementioned write protect state and an errant write condition) to make the single port FIFO device as safe to use as a traditional dual port FIFO storage device.

These and other objects, embodiments and features of the present invention and the manner of obtaining them will become apparent to those skilled in the art, and the invention itself will be best understood by reference to the following Detailed Description read in conjunction with the accompanying Drawing.

DETAILED DESCRIPTION

Figure 1:
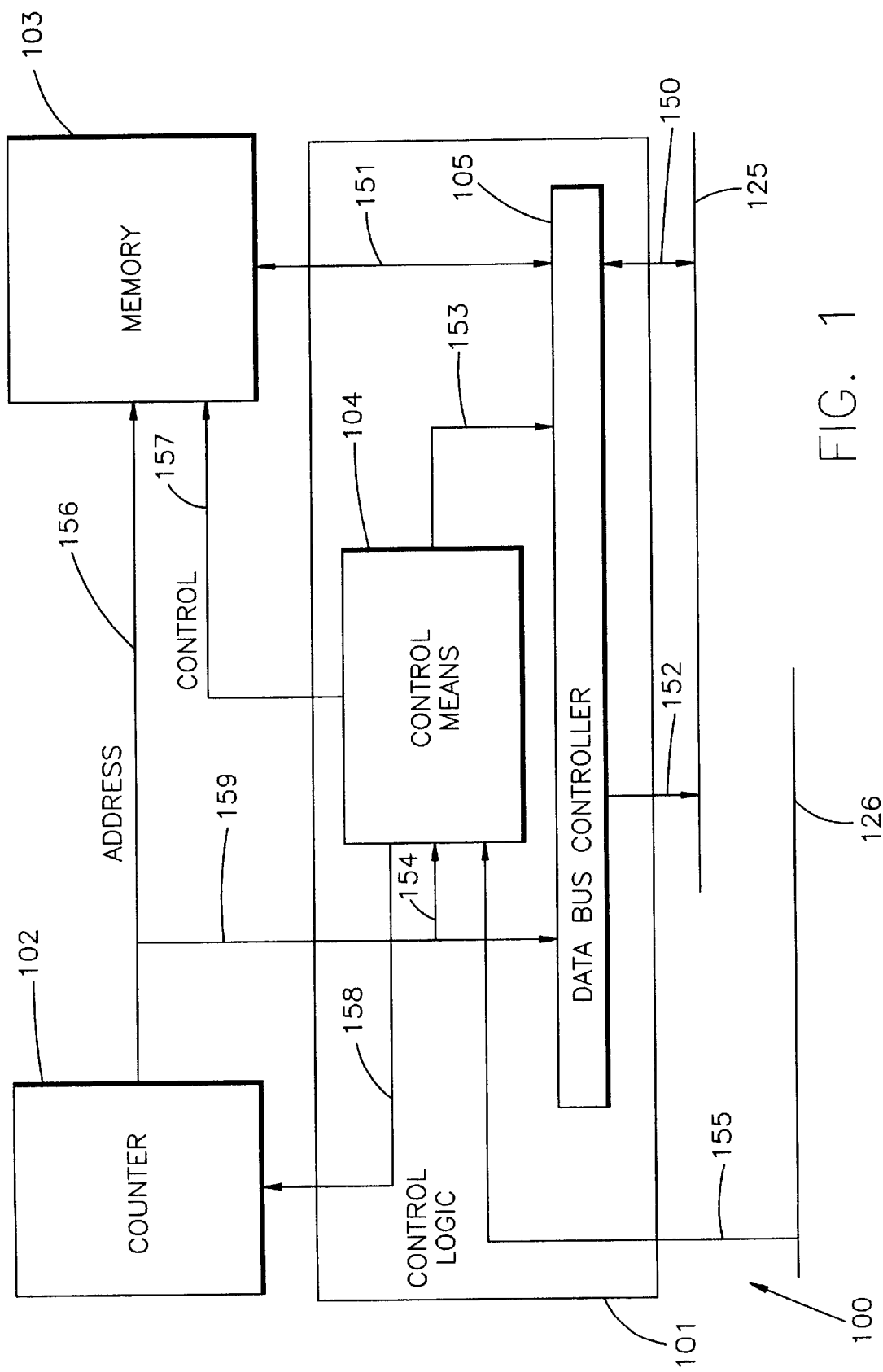
FIG. 1 depicts, in the form of a functional block diagram, the primary elements of an illustrative embodiment of the invention.

Reference should now be made to FIG. 1 which, as indicated hereinabove, depicts the primary elements of an illustrative embodiment of the invention in the form of a functional block diagram.

FIG. 1 depicts a single port FIFO device 100 which is preferably (although not required to be) implemented in a FPGA to realize the aforestated objects of the invention.

More particularly, device 100 (FIFO 100) is shown to include control logic 101 for (a) controlling a FIFO memory addressing mechanism, shown as counter 102 in the embodiment of the invention depicted in FIG. 1 (where counter 102 is used, in accordance with a preferred embodiment of the invention, to provide an address into memory 103); and (b) controlling memory 103 itself (e.g., reads from the memory, writes to the memory, data flow, etc.). In further accord with the preferred embodiment of the invention, memory 103 is a random access memory (RAM), although those skilled in the art will readily appreciate that alternate types of memory may be used without departing from the spirit or scope of the invention.

Control logic 101 is further shown to include control means 104 that itself includes, according to one embodiment of the invention: (a) read/write detector and control logic; (b) write protect logic; (c) errant write detector logic and (d) FIFO "nearly full condition" detection logic (with the term "nearly full condition" having been previously defined herein).

Although described hereinafter for the sake of completeness, this logic ((a)–(d)) is not specifically shown in FIG. 1. Those skilled in the art will readily appreciate how to implement each of the aforementioned control logic components in the form of logic circuits or in terms of software (or even a firmware combination of hardware and software) based on the existence of such circuitry in the prior art; or based on the simplicity of the function to be implemented.

More particularly, the type of read/write detector and control logic circuitry to be included in control means 104 is well known and commonly used to control read/write activity between a microprocessor (an example of the host processor referred to hereinabove) and a memory in most commercially available computing systems.

Write protect logic is also well known to those skilled in the art, logic which could be as simple as, for example, looking for an overflow of a counter (that overflows when a memory is full); with the logic simply setting a write protect bit (flag) when the overflow is detected and inhibiting the making of further entries to memory while the write protect bit is set.

Errant write detector logic can be realized by simply detecting a write to the memory whenever the aforementioned write protect bit is set; and then setting another bit (flag) to signal the errant write has been attempted.

Finally, FIFO "nearly full condition" detection logic (with the term "nearly full condition" having been previously defined herein) can be as simple as logic that monitors the amount of memory in use (which is very simple in the case of the preferred embodiment of the invention where the memory addressing mechanism is counter 102 that inherently is equivalent to the amount of memory in use); with the logic generating a "nearly full condition" signal (causing an interrupt to the host in the case of the preferred embodiment of the invention) when a predefined threshold of memory usage is reached or surpassed.

FIG. 1 further depicts host processor data bus 125 and host processor address and control bus 126.

Bus 125 is used to communicate data being read from or being written to memory 103 by the host via communication links 150 and 151 via data bus controller 105. Data bus controller 105 is also used to control the flow of status information, including diagnostic information such as the existence of an errant write condition and a "nearly full condition"; and the value of counter 102 (the aforementioned FIFO addressing mechanism), to the host via communications link 152 and data bus 125. Internally within FIFO 100, data bus controller 105 is shown receiving status information from control means 104 via communication link 153; and is shown receiving the aforementioned counter value via communication link 154.

As will be explained by example hereinafter (with reference to FIG. 2), the host will need to read and reset the counter; and be aware of the existence of a "nearly full condition" to implement a preferred embodiment of the invention.

Bus 126 is used to communicate control signals from the host to FIFO 100. The control signals (an example of which is to direct FIFO 100 to enter a write protect state, as will be explained as being desirable in certain instances with reference to FIG. 2), are communicated off bus 126 to control means 104 via communication link 155 shown in FIG. 1.

For the sake of completeness, FIG. 1 depicts communication links 156–159. Communications link 156 is used to address memory 103, using the contents of counter 102, in a well known manner in conjunction with the receipt of an memory access control signal from control means 104. In turn, control means 104 obtains counter values via communication links 154 and 159; and provides memory access control signals to memory 103 via communications link 157. Finally, communications link 158 is used by control means 104 to control counter 102 (to, for example, increment the counter or reset it).

Having described the primary components of an illustrative embodiment of the invention with reference to FIG. 1, a description of the operating principals of the invention, along with relevant additional implementation details, will be set forth immediately hereinafter; followed by a description of how the invention actually operates from the perspective of the host processor and from the perspective of the FIFO device itself. These descriptions of how the invention actually operates will be set forth with reference to FIGS. 2–4.

As indicated hereinbefore, the invention departs from known FIFO data storage devices in that while it is built from limited hardware resources it has the aforementioned write protection feature and diagnostic features that permit it to be used as safely as a traditional dual port FIFO.

The write protection feature ensures that the contents of FIFO 100 are not disturbed once FIFO 100 becomes full. A first diagnostic feature provides host software with an indication that the protection feature is in force. A second diagnostic feature provides host software with an indication that it (the software) may have errantly attempted to disturb a full memory before securely and completely emptying the contents of FIFO 100.

In terms of advantages over the prior art, the FIFO device described herein (e.g., FIFO 100) can be fabricated using a small amount of hardware when compared to traditional dual port FIFO devices; while featuring the previously described write protection and diagnostic capabilities.

According to a preferred embodiment of the invention, as indicated hereinbefore, FIFO 100 (as depicted in FIG. 1) may be constructed by using a counter and a RAM (e.g., counter 102 and RAM 103). The implementation contemplated by the preferred embodiment of the invention is in a commercially available FPGA within which those skilled in the art may implement the various functions described herein.

As for how illustrative FIFO 100 operates, the counter value in counter 102 is presented to the address bits of RAM 103 via link 156. The address counter (counter 102) increments monotonically (under the control of control means 104 via link 158 as shown in FIG. 1) and thus the "RAM" (103) is only accessed in sequential fashion (not random) as is typical of a FIFO.

The FIFO in the illustrative embodiment of the invention being described with reference to FIG. 1 is 64 locations deep. Those skilled in the art will readily appreciate that a different desired depth may be readily supported and that 64 locations is made herein for the sake of illustration only.

The 64 locations in the illustrative embodiment of the invention are "pointed to" by the address counter (counter 102). A "storing" circuit (the aforementioned read/write detector and control logic in control means 104) determines when entries are to be made into FIFO memory 103. Counter 102 increments after each storage has been made.

When FIFO memory 103 becomes full (all 64 locations have been written to) or when the host software independently decides to empty the FIFO, counter 102 must be reset to 0. The stored locations must be read prior to further data being stored in memory 103.

Thus, the first data stored (in) is the first data read (out)—a true First-In-First-Out (FIFO) storage device. As the storing of data and the emptying of data cannot happen simultaneously (or in an interleaved fashion) the device is indeed a "single port" FIFO, using industry terms and the definition of a single port device as previously set forth herein.

Those skilled in the art will readily appreciate that the single port design is considerably simpler than a traditional dual port FIFO which, as indicated hereinbefore, permits simultaneous storing and emptying of data (or interleaved operations. This is a very important consideration when hardware resources are limited (a dual port FIFO being more complex with the dual port FIFO requiring, as previously indicated, two address counters; an arbitration mechanism to manage the simultaneous storing and emptying of data; a comparator of the two address counters to determine the "full" condition, etc.).

However, the invention still required a method to determine the "full" condition for proper operation. To accomplish this (using the 64 memory location example), a six bit counter was used to point to the 64 unique locations of the FIFO; with counter 102 being extended to a seventh bit. Whenever the seventh bit becomes asserted, the FIFO is known to be full. This condition acts as a trigger for control means 104 to disable the hardware "storage" circuit referred to hereinbefore, from making new entries into RAM 103. This process in effect realizes the desired hardware protection feature.

When this condition occurs (i.e., when the FIFO memory is full) the FIFO becomes "write protected" (remembering, of course, that the host can independently write protect memory via control means 104 as explained hereinbefore), and this hardware imposed condition is visible to the host software (via control means 104 and data bus controller 105, over communications links 153, 152 and data bus 125), which may not have been (or, otherwise, would not have been) aware of this condition. This is the first diagnostic feature contemplated by the invention.

The host software performs actions which cause data to be stored. However, it does not explicitly have knowledge of which software actions which are causing FIFO storage to take place. Thus, it cannot predict how many locations will be filled at any instant in time.

Likewise, it cannot predict when the FIFO will become full. Control means 104, as explained hereinbefore, determines when FIFO 100 is "nearly full" and alerts the software via an interrupt. However, due to the complex nature of the microprocessor on which the software executes, there is some possibility that the software may continue performing actions that cause FIFO storage before ceasing such activity subsequent to recognition of the interrupt.

Thus, it is possible for the host processor to cause FIFO 100 to become full and still attempt to store more data into FIFO 100 (even though it is already full). To diagnose this unwanted condition, control means 104, as explained hereinabove, will monitor the software's (i.e., the host's) activity after entering the "write protection" state and will record if the software attempted to cause FIFO storage after FIFO 100 became full. This is the second diagnostic feature.

Again, the first diagnostic indicates that the previously stored data is protected from such errant storage attempts; while the second diagnostic indicates errant software activity. Thus, the single port FIFO contemplated by the invention is as robust as a dual port FIFO.

Figure 2:
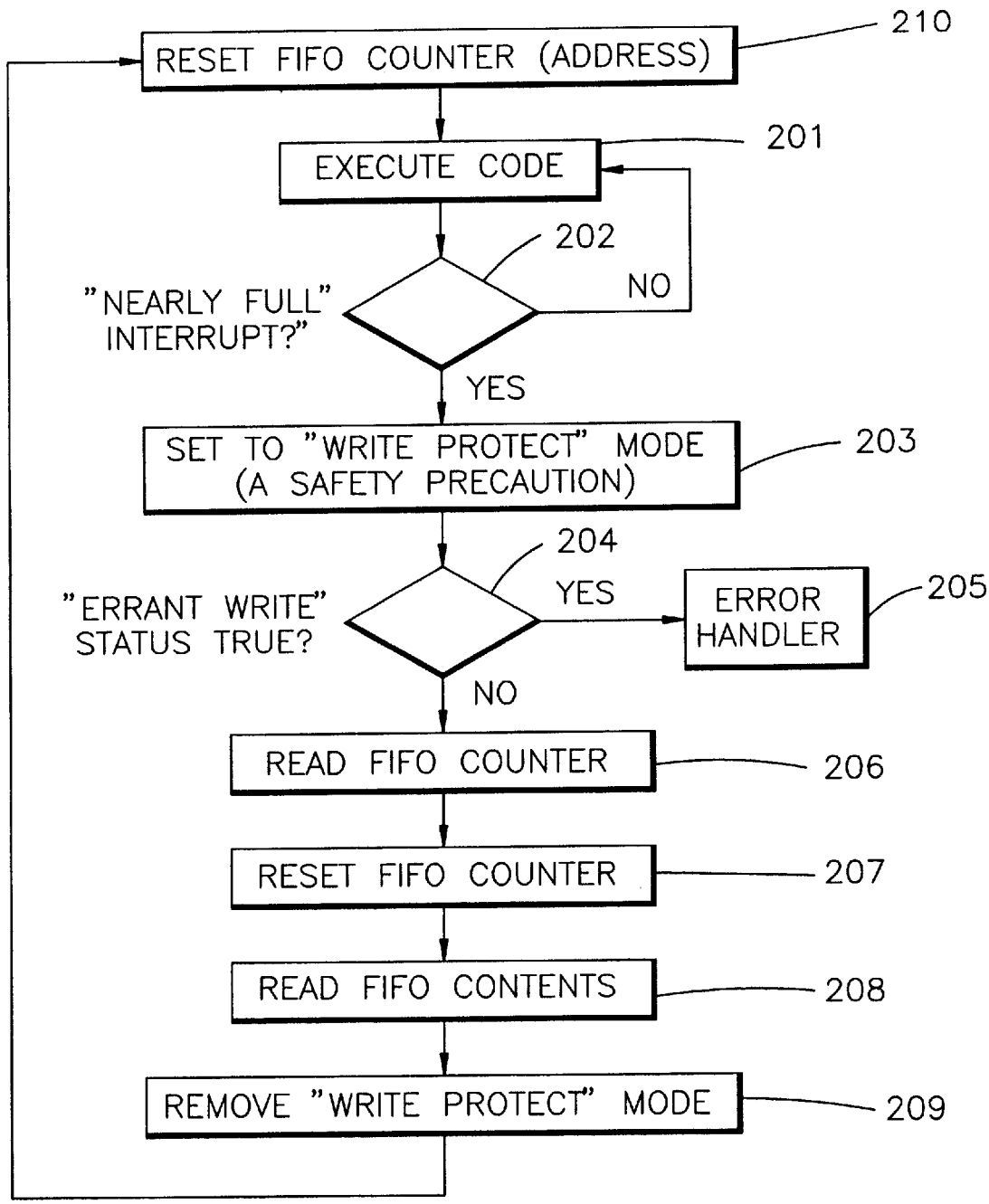
FIG. 2 depicts, in the form of a flowchart, the portion of a process contemplated by the invention (from the perspective of the host processor) that affects host processor operations based on the hosts detection of (1) an interrupt signalling a "nearly full condition" (previously defined), generated in certain circumstances by the storage device contemplated herein; and (2) an "errant write" status (condition), which is entered when an errant write (as previously defined) is detected by the control mechanism for the storage device.

Reference should now be made to FIG. 2 which, as indicated hereinbefore, depicts in the form of a flowchart the portion of a process contemplated by the invention (from the perspective of the host processor) that affects host processor operations based on the hosts detection of (1) a "nearly full" interrupt (previously defined), generated in certain circumstances by the storage device contemplated herein; and (2) an "errant write" status (condition), which also may be set in circumstances described hereinbefore.

In particular, FIG. 2 shows the host processor executing software at block 201 and continuing to do so until a "nearly full" condition is detected by recognizing the receipt from FIFO 100 of a nearly full interrupt.

If such an interrupt is detected (at block 202 in FIG. 2), the host, according to a preferred embodiment of the invention, sets (at block 203 in FIG. 2) the write protect feature of FIFO 100 (independent of whether or not FIFO 100 is actually full), as a safety precaution since, as indicated hereinbefore, there is some possibility that the software may continue performing actions that cause FIFO storage before ceasing such activity subsequent to recognition of the interrupt.

Next, the host determines if an errant write has occurred (at block 204 of FIG. 2); and if so, an error has occurred (data may be lost), and an error handler is invoked (at block 205 of FIG. 2) to deal with this condition. The error handler could perform data recovery activities, simply alert the user that an error has occurred, etc., and does not constitute a part of the invention per se.

If no errant write status is detected, the host (in response to the interrupt) will, according to the illustrative embodiment of the invention, read FIFO counter 102 (at block 206 in FIG. 2); reset counter 102 (at block 207 in FIG. 2); and read the FIFO contents (at block 208 in FIG. 2), with counter 102 being monotonically incremented from zero (assuming zero is the reset value of the counter) until the contents of memory 103 have been read by the host (the number of locations to be read is indicated by the value read at block 206).

Once the FIFO contents have been read, the illustrative process depicted in FIG. 2 calls for the removal of the write protect (shown at block 209 in FIG. 2); and calls for the resetting of counter 102 (shown at block 210 in FIG. 2), to again allow the FIFO to be filled starting with an empty FIFO indication. Normal host processor operations are then again resumed as shown at block 201 of FIG. 2 until another interrupt is detected.

Figure 3:
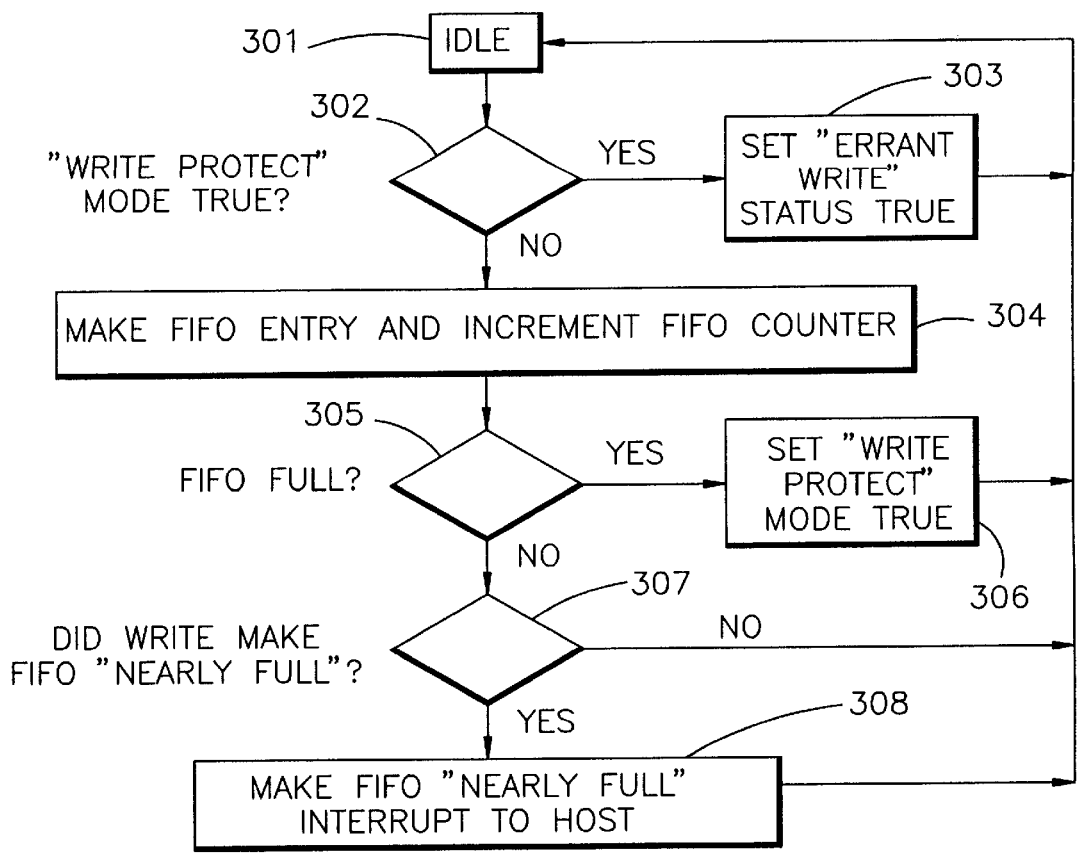
FIG. 3 depicts, in the form of a flowchart, the portion of a process contemplated by the invention (from the perspective of the FIFO circuit contemplated herein while the host is writing into the FIFO), that places the FIFO in a write protect state when the FIFO is full; and which makes write protect and errant write status information available to the host.

Reference should now be made to FIG. 3 which, as indicated hereinbefore, depicts in the form of a flowchart the portion of a process contemplated by the invention (from the perspective of the FIFO circuit contemplated herein while the host is writing into the FIFO), that places the FIFO in a write protect state when the FIFO is full; and which makes write protect and errant write status information available to the host.

In particular, FIG. 3 depicts illustrative FIFO 100 in an idle state (at block 301); followed by (while the host is writing to the FIFO), the FIFO determining (via the aforementioned control means) if it (the FIFO) is in a write protect state. This is illustrated at block 302 of FIG. 3.

If the host is writing to the FIFO while the FIFO is in its write protect state, control means 104 causes an errant write status indication to be set, as shown at block 303 in FIG. 3. The FIFO then, according to the illustrative embodiment of the invention being set forth with reference to FIG. 3, goes back to the idle state as shown at block 301.

As long as there is no write protection, FIFO control means 104 will make an entry into memory 103 and increment counter 102 monotonically (as shown at block 304 in FIG. 3).

After each entry is made, control means 104 determines if the FIFO is full (as shown at block 305 in FIG. 3). If full, the FIFO is placed in the write protect state (as shown at block 306) with the FIFO returning to an idle state (block 301) at least until the memory is emptied.

According to the preferred embodiment of the invention, a test for a "nearly full condition" is made (shown at block 307 in FIG. 3), by control means 104; and if not nearly full, the FIFO contemplated by the invention continues to service further host writes (after passing through the idle state in this embodiment of the invention, although not necessary in alternate implementations), again checking for a write protect state at block 302, etc.

If the last write to memory triggers a "nearly full condition"; control logic 101 generates the previously described interrupt (via control means 104) and forwards it to the host (via data bus controller 105) to signal the nearly full condition of the FIFO (shown at block 308 of FIG. 3).

Figure 4:
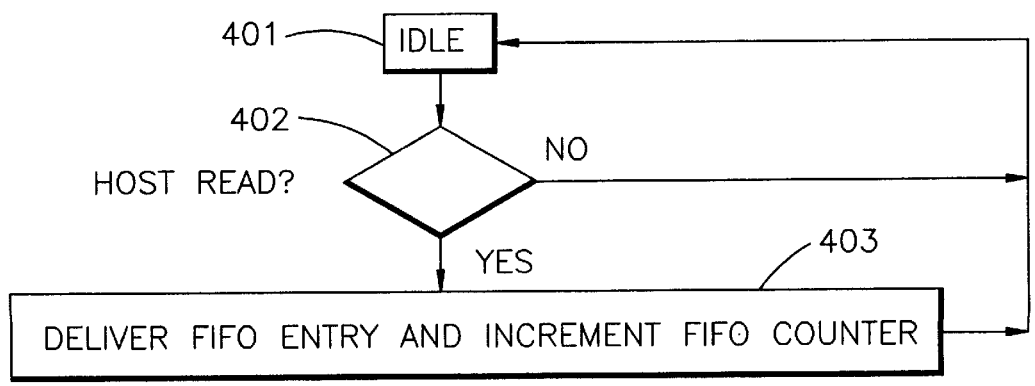
FIG. 4 depicts, in the form of a flowchart, the portion of a process contemplated by the invention that sequentially delivers FIFO entries to the host and operates on the FIFO addressing mechanism (from the perspective of the FIFO circuit at a time when the host is reading from the FIFO).

Reference should now be made to FIG. 4 which, as previously indicated, depicts in the form of a flowchart, the portion of a process contemplated by the invention that sequentially delivers FIFO entries to the host and operates on the FIFO addressing mechanism (from the perspective of the FIFO circuit at a time when the host is reading from the FIFO).

In particular, FIG. 4 depicts an idle state (at block 401) prior to determining that a host read request is pending. At block 402, a determination is made if a host read has been requested and if so, FIFO control logic 101 (via control means 104 and data bus controller 105) may then be used to sequentially deliver the entries requested by the host from memory 103; while monotonically incrementing counter 102 after each entry is retrieved (as shown at block 403 in FIG. 4). In this manner the FIFO is emptied and the FIFO returns to an idle state (as far as reads are concerned) until another host read request is detected (recall the host will reset counter 102 after the contents of the FIFO are read as shown at block 210 of FIG. 2).

What has been described in detail hereinabove are methods and apparatus which meet all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

In view of the above it is, therefore, to be understood that the claims appended hereto are intended to cover all such modifications and variations which fall within the true scope and spirit of the invention.

What is claimed is:

1. A single port storage device serving as a First-In-First-Out ("FIFO") data storage device for a host processor coupled thereto, comprising:
   (a) a memory for at least temporarily storing data provided by said host;
   (b) memory address means for addressing said memory in a sequential and non-random manner;
   (c) control means, coupled to said memory and said memory address means, for controlling the sequential non-random writing of host data to and the sequential non-random reading of host data from said memory in a FIFO fashion, including:
      (c1) means for determining if said memory is full;
      (c2) write protect means for placing said memory in a write protect state whenever said memory is full or as commanded by said host processor;
      (c3) errant write detection means for determining as a function of the quantity of entries stored in the FIFO independent of any particular range of memory protected, if an attempt is made by said host to write to said memory whenever said memory is in a write protect state.

2. Apparatus as set forth in claim 1 wherein said control means further comprises interrupt means for generating a hardware interrupt to said host whenever said memory reaches a predefined nearly full condition.

3. Apparatus as set forth in claim 2 wherein said write protect means is further operative to place said memory in said write protect state in response to a signal from said host acknowledging receipt of said interrupt.

4. Apparatus as set forth in claim 1 wherein said memory, said memory address means and said control means are all implemented in a field programmable gate array (FPGA).

5. Apparatus as set forth in claim 1 wherein said memory means is a random access memory (RAM).

6. Apparatus as set forth in claim 1 wherein said memory address means is a monotonically increasing counter.

7. A method for storing data in an addressable single port data storage device addressed in a sequential and non-random manner, wherein said single port data storage device serves as a First-In-First-Out ("FIFO") memory for a host processor coupled thereto, comprising the steps of:
   (a) at least temporarily storing data provided by said host in said addressable single port data storage device; and
   (b) controlling the sequential non-random writing of host data to and the sequential non-random reading of host data from said device in a FIFO fashion, including the steps of:
      (b1) determining if said memory is full;
      (b2) placing said memory in a write protect state whenever said memory is full or as commanded by said host processor; and
      (b3) determining as a function of the quantity of entries stored in the FIFO independent of the range of memory protected, if an attempt is made by said host to write to said memory whenever said memory is in said write protect state.

8. A method as set forth in claim 7 further comprising the step of generating a hardware interrupt to said host whenever said memory reaches a predefined nearly full condition.

9. A method as set forth in claim 8 further comprising the step of placing said memory in said write protect state in response to a signal from said host acknowledging receipt of said interrupt.

10. A method as set forth in claim 7 further comprising the step of implementing said addressable single port data storage device in a field programmable fate array (FPGA).

11. A method as set forth in claim 7 wherein said step of at least temporarily storing data is performed using a RAM.

12. A method as set forth in claim 7 further comprising the step of utilizing a counter to address said memory in a sequential and non-random manner.

13. A method as set forth in claim 12 further comprising the step of increasing said counter monotonically.

14. Apparatus for storing data in an addressable single port data storage device addressed in a sequential and non-random manner, wherein said single port data storage device serves as a First-In-First-Out ("FIFO") memory for a host processor coupled thereto, comprising:
   (a) a memory for at least temporarily storing data provided by said host processor;
   (b) a counter for addressing said memory in a sequential and non-random manner;
   (c) write protect means for placing said data storage device in a write protect state, wherein said write protect means may place said data storage device in said write protect state as directed by said host processor;
   (d) means for determining, coupled to said counter, if said data storage device is in a predefined nearly full condition;
   (e) means for generating a hardware interrupt in response to the detection of said nearly full condition;
   (f) errant write detection means for detecting as a function of the quantity of entries stored in the FIFO independent of any particular range of memory protected, if an attempt is made to write to said data storage device while said device is in said write protect state.

15. Apparatus as set forth in claim 14 wherein said write protect means is operative to place said data storage device in said write protect state whenever said FIFO is full.

16. Apparatus as set forth in claim 15 wherein said write protect means is further operative to place said storage device in said write protect state in response to a signal from said host acknowledging receipt of said hardware interrupt.

17. Apparatus as set forth in claim 14 wherein said means for determining, said means for generating and said errant write detection means are all implemented in a field programmable gate array (FPGA).

18. A method for storing data in an addressable single port data storage device addressed in a sequential and non-random manner, wherein said single port data storage device serves as a First-In-First-Out ("FIFO") memory for a host processor coupled thereto, comprising the steps of:
  (a) placing said data storage device in a write protect state thereby preventing data from being written thereto, wherein said write protect state may be entered as directed by said host processor;
  (b) determining if said data storage device is in a predefined nearly full condition;
  (c) generating a hardware interrupt in response to the detection of said nearly full condition;
  (d) detecting as a function of the quantity of entries stored in the FIFO independent of any particular range of memory protected, if an attempt is made to write to said data storage device while said device is in said write protect state; and
  (e) utilizing a monotonically increasing counter to address said memory in a sequential and non-random manner.

19. A method as set forth in claim 18 wherein said step of placing said data storage device in said write protect state is performed whenever said FIFO is full.

20. A method as set forth in claim 19 wherein said step of placing said data storage device in said write protect state is performed in response to a signal from said host acknowledging receipt of said hardware interrupt.

21. A method for storing data in an addressable single port data storage device serving as a First-In-First-Out ("FIFO") memory for a host processor coupled thereto, wherein said data storage device is addressable via a resettable counter used to sequentially and non-randomly address said storage device and includes means for signaling a predefined nearly full condition, means for signaling a write protect state and means for signaling an errant write status condition whenever said host attempts a write to said FIFO memory when a write protect state exists, comprising the steps of:
  (a) utilizing said counter to sequentially and non-randomly address said addressable single port data storage device;
  (b) at least temporarily storing data provided by said host in said addressable single port data storage device;
  (c) controlling the sequential non-random writing of host data to and the sequential non-random reading of host data from said device in a FIFO fashion, including the steps of:
    (c1) determining if said device is in said predefined nearly full condition;
    (c2) placing said device in said write protect state whenever said device is determined to be in said nearly full condition or when commanded to by said host processor;
    (c3) determining as a function of the quantity of entries stored in the FIFO independent of any particular range of memory protected and said write protect state, if an errant write status condition exists; and
    (c4) signaling an error whenever said errant write status condition is determined to exist.

22. A method as set forth in claim 21 further comprising the step of retrieving data provided by said host from said addressable single port data storage device, wherein said step of retrieving further comprises the steps of:
  (a) reading and resetting said counter;
  (b) reading the contents of said memory utilizing the value of the counter as read;
  (c) taking said device out of said write protect state after the contents of said memory have been read; and
  (d) resetting said counter.

23. A single port data storage device serving as a First-In-First-Out ("FIFO") memory for a host processor coupled thereto, comprising:
  (a) a memory for storing data provided by a host processor:
  (b) write protect means for placing said memory in a write protect state to ensure the integrity of data stored in said memory, wherein said write protect means may place said memory in said write protect state as directed by said host processor;
  (c) first diagnostic means for determining when said memory is in said write protect state and for making available to said host processor an indication that said memory is in said write protect state;
  (d) second diagnostic means for determining as a function of the quantity of entries stored in the FIFO independent of any particular range of memory protected, if said host processor is errantly attempting a write to said memory when said memory is in said write protect state and for making available to said host processor an indication that said memory is in an errant write state; and
  (e) a monotonically increasing counter for addressing said memory in a sequential and non-random manner.

24. Apparatus as set forth in claim 23 further comprising means for generating a hardware interrupt to said host whenever said memory reaches a predefined nearly full condition.

25. Apparatus as set forth in claim 23 wherein said write protect means is operative to place said memory in said write protect state whenever said FIFO is full.

* * * * *